US007841948B2

(12) United States Patent
Suzuki et al.

(10) Patent No.: US 7,841,948 B2
(45) Date of Patent: Nov. 30, 2010

(54) CROSS GROOVE TYPE CONSTANT VELOCITY JOINT

(75) Inventors: Satoshi Suzuki, Handa (JP); Kenji Oe, Chita (JP)

(73) Assignee: JTEKT Corporation, Osaka-shi (JP)

(*) Notice: Subject to any disclaimer, the term of this patent is extended or adjusted under 35 U.S.C. 154(b) by 485 days.

(21) Appl. No.: 11/858,469

(22) Filed: Sep. 20, 2007

(65) Prior Publication Data

US 2008/0081704 A1 Apr. 3, 2008

(30) Foreign Application Priority Data

Sep. 29, 2006 (JP) ............................ 2006-267846
Sep. 29, 2006 (JP) ............................ 2006-267890

(51) Int. Cl.
*F16D 3/226* (2006.01)

(52) U.S. Cl. ...................................... 464/144; 464/906

(58) Field of Classification Search ................ 464/144, 464/906

See application file for complete search history.

(56) References Cited

U.S. PATENT DOCUMENTS 1,524,161 A * 1/1925 Weiss ........................ 464/906
1,985,278 A * 12/1934 Bradley ...................... 464/906
4,205,925 A * 6/1980 Fisher ........................ 464/906
5,632,683 A * 5/1997 Fukumura et al. ........... 464/144
5,967,900 A 10/1999 Tanigaki
6,159,103 A * 12/2000 Lu ............................ 464/906
6,273,825 B1 8/2001 Schwärzler et al.
7,040,991 B2 * 5/2006 Kuczera et al. ............. 464/144

FOREIGN PATENT DOCUMENTS

DE 197 57 392 A1 7/1998
WO 2005/057035 A1 6/2005

* cited by examiner

*Primary Examiner*—Greg Binda
(74) *Attorney, Agent, or Firm*—Oblon, Spivak, McClelland, Maier & Neustadt, L.L.P.

(57) ABSTRACT

A cross groove type constant velocity joint 10 comprises a cuplike outer race 11, an inner race 12, plural balls 13 and a cage 14. The outer race 11 has plural outer grooves 11*a* twisting about a rotational axis of the outer race 11 on its inner surface. The outer race 11 itself has plural restrictions 11*b* at the back of the outer grooves 11*a* to prevent the balls 13 from dropping out of the outer grooves 11*a* where the respective ball 13 is at the innermost end of the outer groove 11*a*.

1 Claim, 4 Drawing Sheets

CROSS GROOVE TYPE CONSTANT VELOCITY JOINT

INCORPORATION BY REFERENCE

The present application claims priority under 35 U.S.C. §119 to Japanese Patent Applications No. 2006-267846 filed on Sep. 29, 2006 and No. 2006-267890 filed on Sep. 29, 2006. The contents of the applications are incorporated herein by reference in their entirety.

BACKGROUND OF THE INVENTION

1. Field of the Invention

This invention relates to a cross groove type constant velocity joint whose grooves of an outer race cross grooves of an inner race in a circumferential direction.

2. Discussion of the Background

A cross groove type constant velocity joint comprises an outer race with plural outer grooves on its inner surface, an inner race with plural inner grooves on its outer surface, plural balls between the outer and inner grooves and a cage with plural windows to hold the balls between the outer and inner races. The outer grooves of the outer race are twisted about the rotational axis of the outer race and the inner grooves of the inner race are oppositely twisted about the rotational axis of the inner race. The outer race is formed to a cuplike shape by forging, and then the outer grooves are roughly machined by a cutting tool and are ground by a grinding tool. The grinding tool is a sphericity whose diameter is a little larger than the diameter of the balls, because the balls roll on the grooves. Thus, to prevent the grinding tool from interfering with the innermost end of the cuplike outer race, concave recesses are continuously formed at the back of the respective outer grooves before grinding the outer grooves. The respective recesses are generally a partial sphericity whose diameter is larger than the diameter of the grinding tool. That is, the recesses have enough room for the balls to drop into. Thus the constant velocity joint has a restriction to prevent the balls from dropping into the recesses when a joint angle of the constant velocity joint reaches a predetermined angle. The predetermined angle of the joint angle may occur, for example, when an operator lifts the constant velocity joint in order to assemble it into a vehicle. If the constant velocity joint does not have the restriction, the outer race may be held by a shaft connected with the inner race so that some of the balls may drop into the recesses. In such an event, the operator must dismantle and reassemble the joint.

Japanese utility model application publication No. H01-69916, for example, discloses a boot having a metal part or a stiff boot in order to restrict the joint angle. And Japanese utility model application publication No. H06-32755 discloses a circlip for the restriction of the joint angle. These prior arts need an additional element such as the circlip or the special boot with metal/stiffness, which increases the cost and complexity of the assembly process.

SUMMARY OF THE INVENTION

According to the invention, a cross groove type constant velocity joint comprises a cuplike outer race, an inner race, plural balls and a cage. The outer race has plural outer grooves twisting about a rotational axis of the outer race on its inner surface. The inner race is slidably disposed in the outer race for movement in a direction of the rotational axis of the outer race, and has plural inner grooves twisting about a rotational axis of the inner race on its outer surface. The balls are disposed between the outer grooves and the inner grooves at crossing points of both grooves so as to roll on the grooves. The cage is disposed between the outer race and the inner race, and has plural windows to hold the balls. The outer race itself has plural restrictions at the backs of the outer grooves to prevent the balls from dropping out of the outer grooves when the respective balls are at the innermost end of the outer groove.

BRIEF DESCRIPTION OF THE DRAWINGS

Various objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
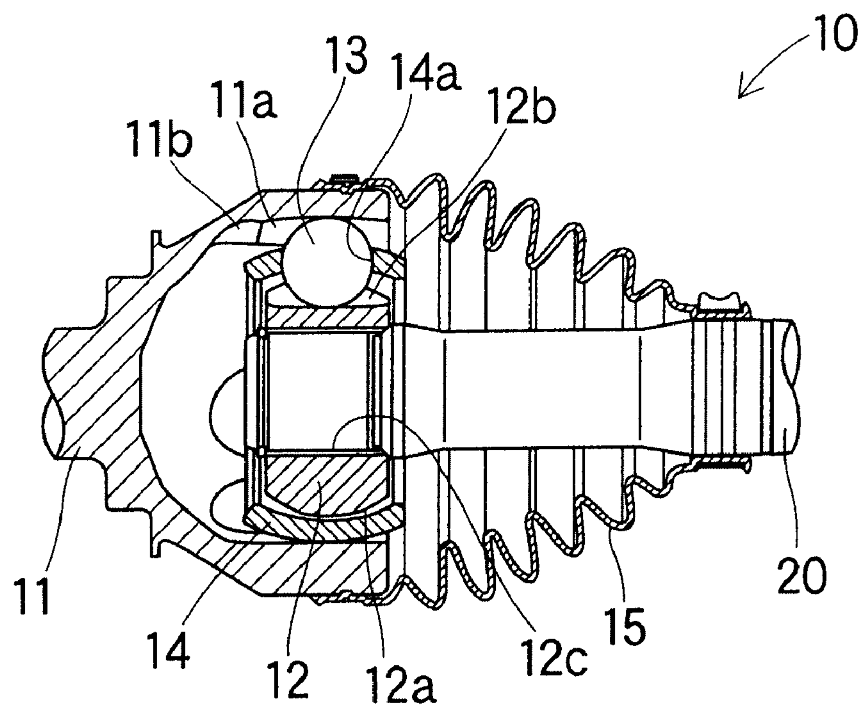
FIG. 1 is a longitudinal section view of a cross groove type constant velocity joint of a first embodiment related to the invention.

A first embodiment of a cross groove type constant velocity joint related to the present invention will be described with reference to FIGS. 1 to 4. As shown in FIG. 1, the constant velocity joint 10 comprises an outer race 11, an inner race 12, balls 13, a cage 14 and a boot 15.

Figure 2:
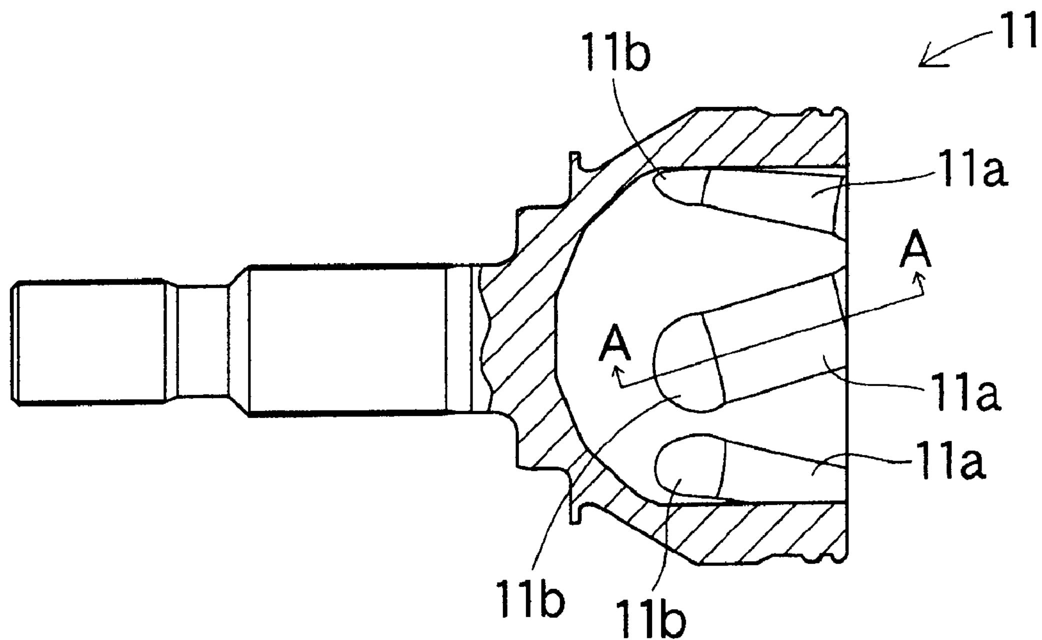
FIG. 2 is a longitudinal section view of an outer race of the first embodiment.

The outer race 11, as shown in FIGS. 1 and 2, is formed into a cuplike shape (cylinderlike shape with a bottom). The outer race 11 has plural outer grooves 11*a* on its inner surface. The outer grooves 11*a* are twisted about the rotational axis of the outer race 11 and the centerlines of the outer grooves 11*a* are straight. Alternating outer grooves 11*a*, as shown in FIG. 2, are oppositely twisted. For example, the adjacent outer grooves 11*a* and 11*a* approach one another at one end of the outer race 11 but separate at the other side. On the inner surface of the outer race 11, concave recesses 11*b* are continuously formed at the backs of the outer grooves 11*a* (left side in FIG. 2). The recesses 11*b* will be described hereafter.

As shown in FIG. 1, the inner race 12 is cylinderlike and connects with one end of a shaft 20. The outermost surface 12*a* of the inner race 12 shapes an approximate circular arc in a longitudinal section view, namely an approximate partial sphericity. The inner race 12 has plural inner grooves 12*b* on its outer surface. The inner grooves 12*b* are twisted about the rotational axis of the inner race 12 and the centerlines of the inner grooves 12*b* are straight. Alternate inner grooves 12*b* are oppositely twisted. For example, the adjacent inner grooves 12*b* and 12*b* approach one another at one end of the outer race 11 but separate at the other side. There is a spline bore 12*c* on the inner surface of the inner race 12 to engage with a spline shaft at one end of the shaft 20. The inner race 12 is slidably disposed in the outer race 11 for movement in the direction of the rotational axis of the outer race 11. The inner grooves 12*b* of the inner race 12 cross the outer grooves 11*a* of the outer race 11 in the view of radial direction.

The balls 13 are disposed between the outer grooves 11*a* of the outer race 11 and the inner grooves 12*b* of the inner race 12, so as to circumferentially engage with and longitudinally roll on both grooves 11*a*, 12*b*. The balls 13 are disposed at the crossing points of the outer grooves 11*a* and the inner grooves 12*b*. Specifically, the balls 13 are disposed at the circumferential crossing points of the centerlines of the outer grooves 11*a* and the centerlines of the inner grooves 12*b*. The centerlines substantially correspond to the trajectories of the centers of the balls 13. Thus torque is transmitted between the outer race 11 and the inner race 12 through the balls 13.

The cage 14, as shown in FIG. 1, is cylinderlike. In detail, the inner surface of the cage 14 is an approximate partial sphericity corresponding to the outermost surface 12*a* of the inner race 12, and the outer surface of the cage 14 is also an approximate partial sphericity. The cage 14 is disposed between the outer race 11 and the inner race 12. In detail, the cage 14 is disposed between the inner surface of the outer race 11 and the outermost surface 12*a* of the inner race 12. The cage 14 has a plural number of approximate square windows 14*a* arranged equiangularly. The number of windows 14*a* is as same as the number of balls 13. The balls are inserted into the windows 14*a*. Thus the windows 14*a* hold the balls 13.

The boot 15 is bellowslike. One end of the boot 15 is directly fixed to the outer surface of the outer race 11 at its opening end by a clamp. The other end of the boot 15 is directly fixed to the outer surface of the shaft 20 by another clamp. Therefore the boot 15 seals the opening end of the outer race 11.

Figure 3:
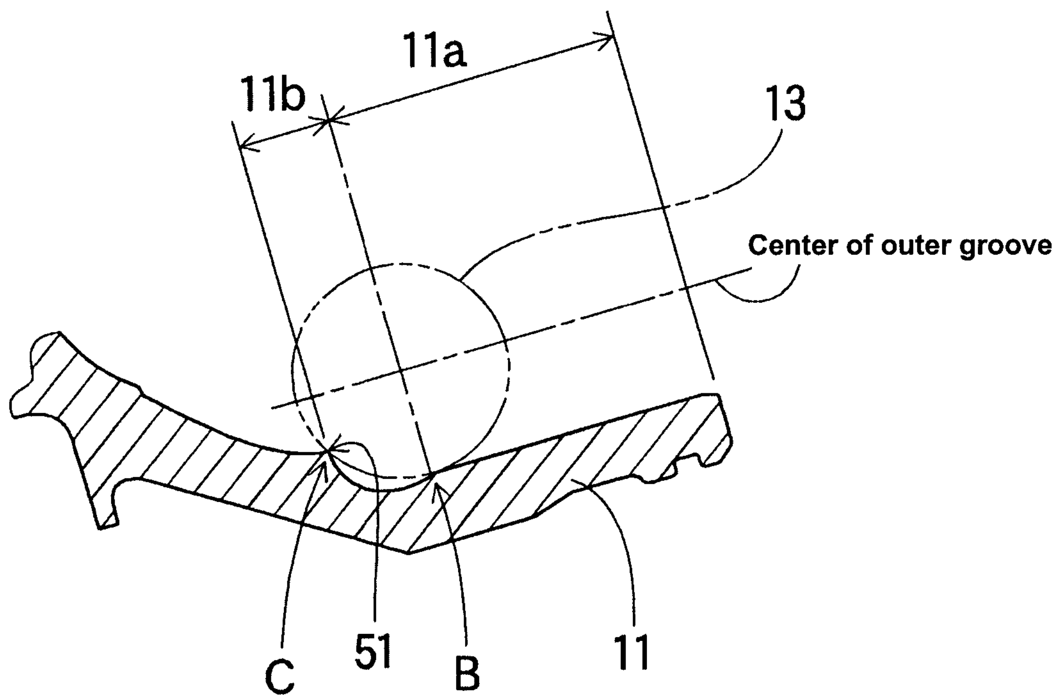
FIG. 3 is an enlarged partial view of A-A section of FIG. 2.

Next, the recesses 11*b* will be described in detail with reference to FIG. 3. One of the recesses 11*b* will be described hereafter because all of them are the same. FIG. 3 is an enlarged A-A section view of FIG. 2 so as to show a section view of the longitudinal outer groove 11*a*. As shown in FIG. 3, the range of the outer groove 11*a* is from the opening of the outer race 11 to the point B. The recess 11*b* is continuously formed at the back of the outer groove 11*a* (the innermost side of the cuplike outer race 11) by a cutting tool before grinding the outer groove 11*a*. Thus the recess 11*b* is formed from the point B (the innermost end of the outer groove 11*a*) to the point C. The recess 11*b* is not formed circumferentially on the inner surface of the outer race 11 but at the back of the outer groove 11*a* by cutting before grinding the outer groove 11*a*. The recess is an aspherical concavity. Specifically, the curvature of the recess 11*b* is larger than that of the outer groove 11*a* in the crosswise direction of the outer groove 11*a*, but is smaller than that of the ball 13 in the longitudinal direction of the outer groove 11*a*. Thus the distance of the center of the recess 11*b* (at a point midway between point B and point C) from the rotational axis of the outer race 11 is larger than that of the outermost end of the recess 11*b* (point B) from the rotational axis of the outer race 11.

At the innermost end of the recess 11*b* (point C), there is a projecting contact region 51 that is formed by the circumferential surface of the recess 11*b*. Namely, the contact region 51 is the contour of the innermost of the recess 11*b* at the end of the recess farthest from the outer groove 11*a*. The contact region (projection) 51 contacts the ball 13 when the ball 13 reaches the innermost of the outer groove 11*a* (chain double-dashed line in FIG. 3). Thus the ball 13 is prevented from dropping into the recess 11*b*. That is, the contact region 51 restricts the ball 13 from moving to the innermost of the outer race 11, beyond the range of the outer groove 11*a*. Therefore even if the constant velocity joint 10 is hung at a maximum angle by an operator during installation, the ball 13 does not drop out of the outer groove 11*a* and does not drop into the recess 11*b*.

Next, grinding process of the outer groove 11*a* will be described with reference to FIG. 4, that shows the same part as the enlarged section view of FIG. 3. The outer groove 11*a* is ground by a grinding tool G shown in FIG. 4. The grinding tool G has a stem G1 and a grindstone G2 that is arranged at the end of the stem G1. The grindstone G2 is a partial sphericity that has a spherical portion G21 and a flattened portion G22. The spherical portion G21 is at the tip of the stem G1. The flattened portion G22 is at the tip of the spherical grindstone G2 and is perpendicular to the axis Gs of the stem G1. The spherical portion G21 of the grind stone G2 corresponds to a hypothetical sphericity 100 whose diameter is 1.0 to 1.1 times of that of the ball 13, so that the flattened portion G22 is inside the hypothetical sphericity 100.

The axis Gs of the grinding tool G is set at the predetermined angle θ3 from the centerline of the outer groove 11*a*. The grinding tool G is rotated about its axis Gs and moved from the opening to the bottom of the outer race 11 along the centerline of the outer groove 11*a*, so as to grind the outer groove 11*a* from the opening to the bottom.

Figure 4:
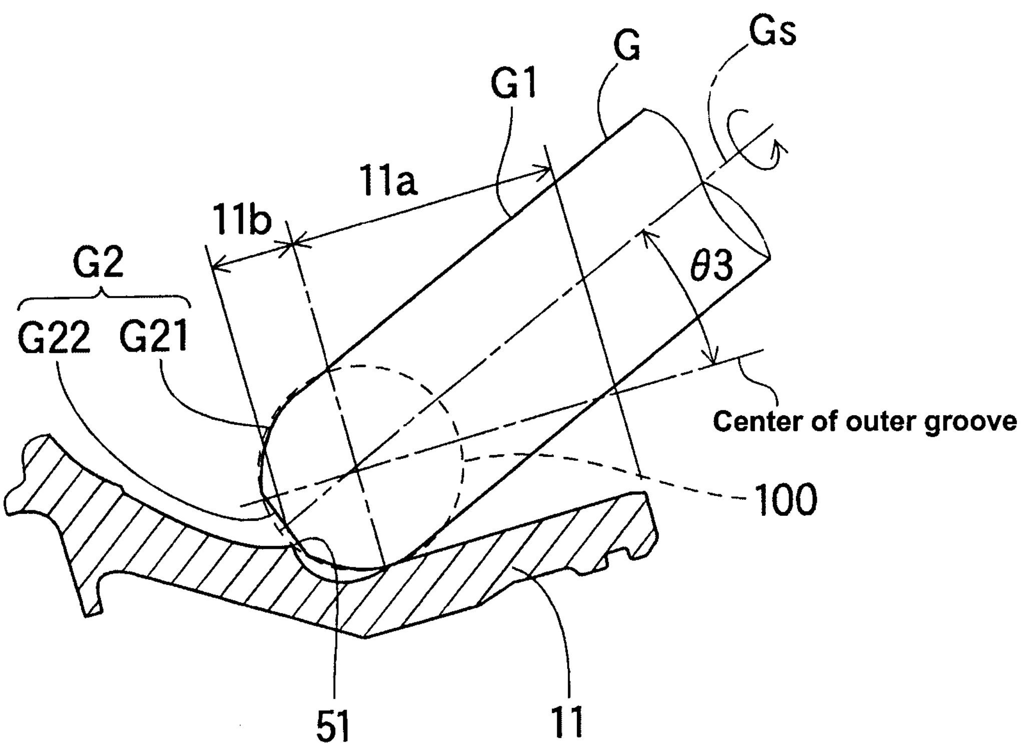
FIG. 4 is an explanatory section view of grinding one outer groove of the first embodiment.

When grinding the outer groove 11*a* is completed, the grinding tool G is located at the innermost end of the outer groove 11*a* as shown in FIG. 4. At this time, because of the flattened portion G22, the grinding tool G does not contact the contact region 51. Therefore although the curvature of the recess 11*b* is smaller than that of the ball 13 in the longitudinal direction of the outer groove 11*a*, there is a sufficient space for the grinding tool G to grind the outer groove 11*a*. Therefore no additional part is needed as the restriction of the ball 13 so as to reduce the cost.

Figure 5:
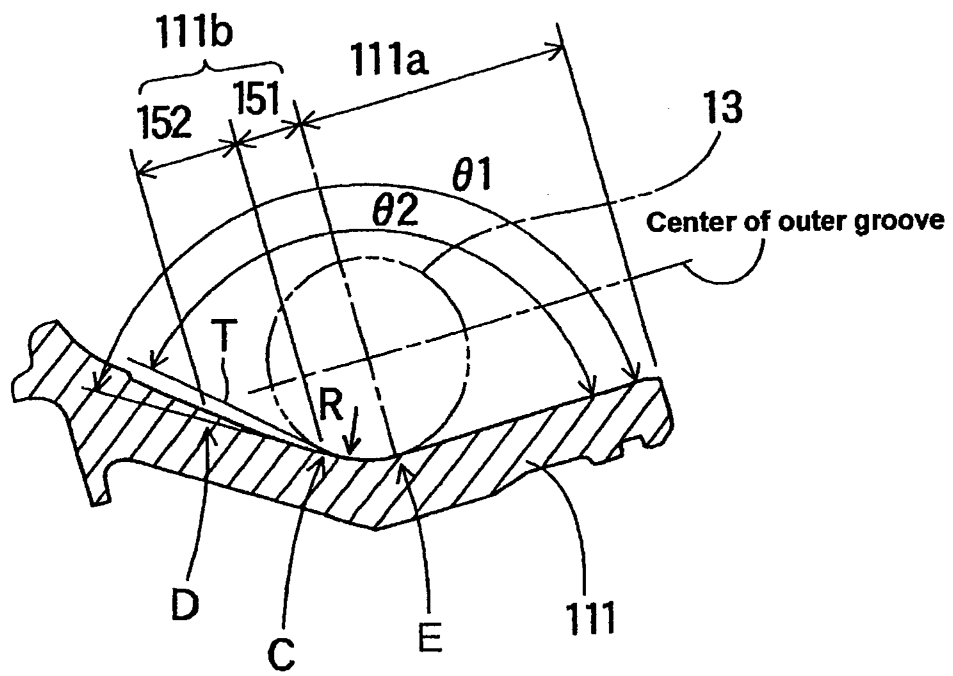
FIG. 5 is an enlarged partial section view of a second embodiment related to the invention.
Figure 6:
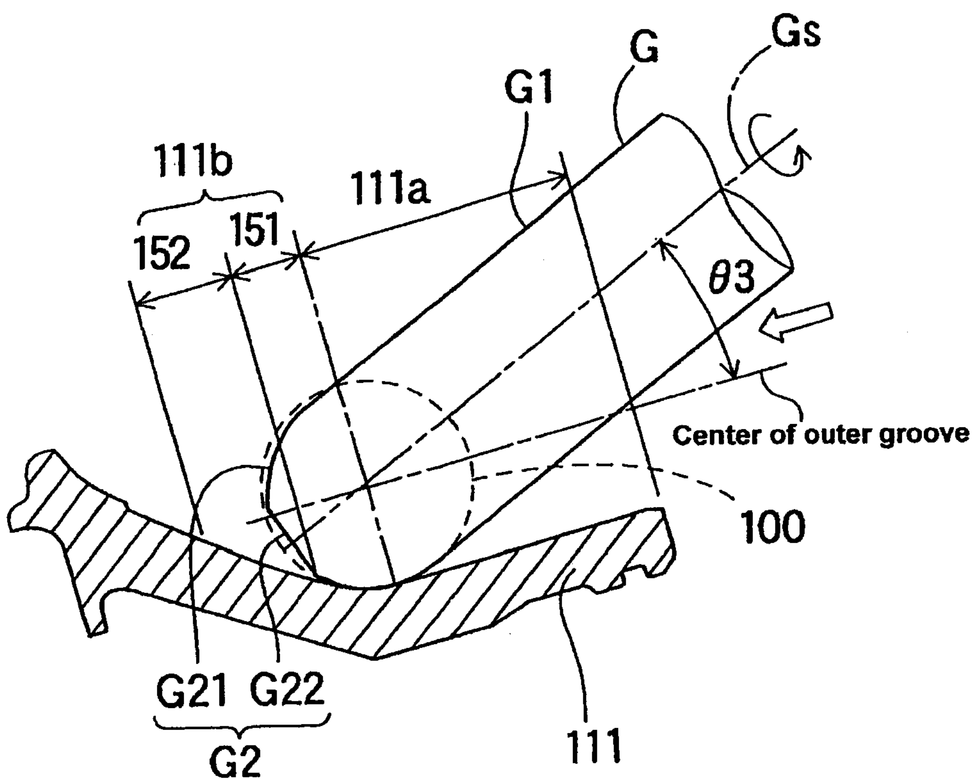
FIG. 6 is an explanatory section view of grinding one outer groove of the second embodiment.

A second embodiment of a cross groove type constant velocity joint related to the present invention will be described with reference to FIGS. 5 and 6. In FIGS. 5 and 6, the same/equivalent parts will be indicated by the same reference numbers/symbols as in FIGS. 1 to 4 and the explanation of those parts will be omitted.

The recess 111*b* of the second embodiment is formed at the back of the outer groove 111*a* by cutting before grinding the outer groove 111*a*. The distance from the rotational axis of the outer race 111 to the surface of the recess 111*b* gradually decreases from the opening side to the innermost side of the outer race 111 (from the right side to the left side in FIG. 5). Namely, in the recess 111*b*, point E of the boundary between the recess 111*b* and the outer groove 111*a* is at the longest distance from the rotational axis of the outer race 111. On the other hand, point D of the innermost side of the recess 111*b* is at the shortest distance from the rotational axis of the outer race 111. The entirety of the recess 111*b* is at shorter distance from the rotational axis of the outer race 111 than is the outer groove 111*a*. That is, the recess 111*b* is not a concavity so that the ball 13 does not drop into the recess 111*b*. Therefore the ball 13 is prevented from dropping into the recess 111*b*. The recess 111*b*, in detail, has a contact region 151 at the opening side of the outer race 111 and a depth region 152 at the bottom side. The contact region 151 extends from the point E to point C of FIG. 5, and the depth region 152 extends from the point C to point D.

The contact region 151 is a curved surface with radius R whose tangent line corresponds to the bottom of the outer groove 111*a* in the section view of FIG. 5. The contact region 151 is at shorter distance from the rotational axis of the outer race 111 at the bottom side than at the opening side thereof. Thus, when the ball 13 is at the innermost end of the outer groove 111*a* as shown by the chain double-dashed line in FIG. 5, the contact region 151 restricts the ball 13 from moving further toward the innermost end of the outer race 111. The ball 13 is stopped by the contact region 151 so as to be prevented from dropping out of the outer groove 111*a* and dropping into the depth region 152.

The depth region 152 in the longitudinal section view of the outer groove 111*a*, is a tapered line. The taper of the depth region 152 reduces its diameter toward the bottom of the outer race 111. The taper angle of the depth region 151 is the angle θ1 relative to the bottom of the outer groove 111*a* (θ1 is an obtuse angle). The taper angle of the tangent line T of the ball 13 at the point C is the angle θ2 relative to the bottom of the outer groove 111*a* (θ2 is an obtuse angle). In this case, the taper angle θ1 of the depth region 152 is larger than the taper angle θ2 of the tangent line T but smaller than 180 degrees. In FIG. 5, the taper angle θ1 of the depth region 152 is a little larger than the taper angle θ2 of the tangent line T.

Next, a grinding process of the outer groove 111*a* will be described with reference to FIG. 6, which shows is the same part as the enlarged section view of FIG. 5. The outer groove 111*a* is ground by a grinding tool G shown in FIG. 6. The grinding tool G has a stem G1 and a grindstone G2 that is arranged at the end of the stem G 1. The grindstone G2 is a partial sphericity that has a spherical portion G21 and a flattened portion G22. The spherical portion G21 is at the tip of the stem Gl. The flattened portion G22 is at the tip of the spherical grindstone G2 and is perpendicular to the axis Gs of the stem 01. The spherical portion G21 of the grind stone G2 corresponds to a hypothetical sphericity 100 whose diameter is 1.0 to 1.1 times of that of the ball 13, so that the flattened portion G22 is inside the hypothetical sphericity 100.

The axis Gs of the grinding tool G is set at the predetermined angle θ3 from the centerline of the outer groove 111*a*. The grinding tool G is rotated about its axis Gs and moved from the opening to the bottom of the outer race 111 along the centerline of the outer groove 111*a*, so as to grind the outer groove 111*a* from the opening to the bottom. FIG. 6 shows when the innermost end of the outer groove 111*a* is ground by the grinding tool G At this moment, the spherical portion G21 of the grinding tool G grinds the contact region 151 at the curvature radius R. In other words, when one part of the spherical portion G21 grinds the innermost end of the outer groove 111*a*, the contact region 151 is ground by another part of the spherical portion G21. Therefore the grinding tool G grinds the contact region 151 and the innermost end of the outer groove 111*a* at the same time.

When grinding the outer groove 111*a*and the contact region 151 is completed, the grinding tool G is located at the innermost end of the outer groove 111*a* as shown in FIG. 6. At this time, because of the flattened portion G22, the grinding tool G does not contact the depth region 152 described hereinbefore. Therefore the outer groove 111*a* and the contact region 151 are sufficiently ground by the grinding tool G. Therefore no additional part is needed as the restriction of the ball 13 so as to reduce the cost.

Figure 7:
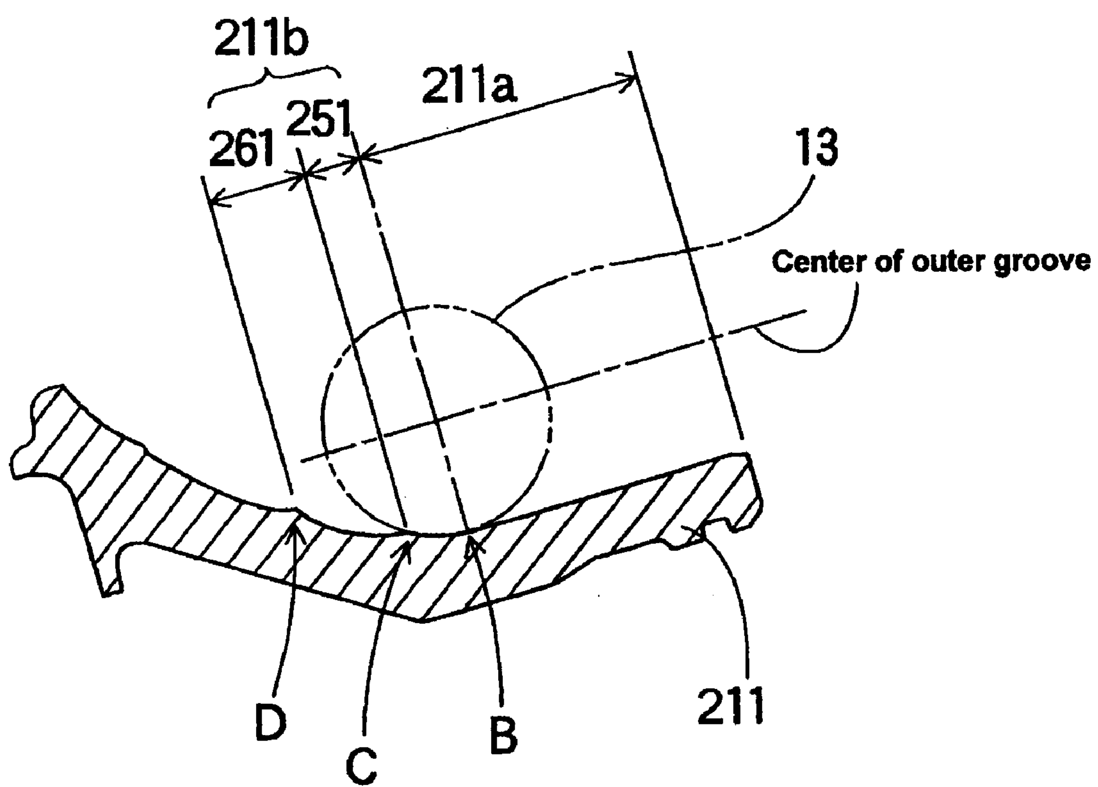
FIG. 7 is an enlarged partial section view of a third embodiment related to the invention.

A third embodiment of a cross groove type constant velocity joint related to the present invention will be described with reference to FIG. 7. FIG. 7 shows an enlarged partial section view of the outer race 211. In FIG. 7, the same/equivalent parts will be indicated by the same reference numbers/symbols as the first and second embodiments and the explanation of those parts will be omitted. Only difference from the second embodiment is a depth region 261 so that the depth region 261 will be only described.

The depth region 261 extends from point C to point D in FIG. 7. The depth region 261 is a partial spherical concavity whose curvature radius is larger than that of the ball 13. When grinding the outer groove 211*a* and the contact region 251 is completed, the grinding tool G is located at the innermost of the outer groove 211*a*. At this time, the grinding tool G does not contact the depth region 261. Therefore the outer groove 211*a* and the contact region 251 are sufficiently ground by the grinding tool G. In the third embodiment, no additional part is needed as the restriction of the ball 13 so as to reduce the cost.

Obviously, numerous modifications and variations of the present invention are possible in light of the above teachings. It is thereby to be understood that within the scope of the appended claims, the present invention may be practiced otherwise than as specifically described herein.

What is claimed is:

1. A cross groove type constant velocity joint, comprising:

a cuplike outer race having a plurality of outer grooves twisting about a rotational axis of the outer race on an inner surface thereof;

an inner race slidably disposed in the outer race and movable in a direction of the rotational axis of the outer race, the inner race including a plurality of inner grooves twisting about a rotational axis of the inner race on an outer surface thereof;

a plurality of balls respectively disposed between the outer grooves and the inner grooves at crossing points of respective inner and outer grooves so as to roll on the outer and inner grooves; and a cage disposed between the outer race and the inner race, the cage including a plurality of windows to hold the balls, wherein the outer race includes a plurality of restrictions at innermost ends of the outer grooves, the restrictions being located toward a bottom of the cuplike outer race to prevent the balls from dropping out of the outer grooves when the respective balls are at innermost ends of the outer grooves, wherein each of the restrictions comprises a contact region at the innermost side of the outer groove and a depth region at the innermost side of the contact region, and wherein the ball contacts the contact region when the ball is at the innermost end of the outer groove so as to be restricted from moving further toward the innermost end of the outer groove, wherein the depth region is a partial spherical concavity having a larger curvature radius than the ball, and wherein the restrictions and the outer grooves form a contiguous surface.

* * * * *